Patented Oct. 25, 1949

2,486,162

UNITED STATES PATENT OFFICE 2,486,162

ORGANO-SILOXANES

James Franklin Hyde, Corning, N. Y., assignor to Corning Glass Works, Corning, N. Y., a corporation of New York No Drawing. Application February 26, 1942, Serial No. 432,528

1 Claim. (Cl. 260—46.5)

This invention is a continuation in part of my copending applications Serial Numbers 318,373 filed February 10, 1940, now Patent Number 2,386,466, and 353,302 filed August 19, 1940, now Patent Number 2,371,050 and relates to the products obtained by the hydrolysis and dehydration of organo-silicanes. The hydrolysis of a silicane of the type $SiX_4$, where X is any hydrolyzable atom or group, such as halogen, alkoxy, hydrogen, etc., does not result in a simple hydroxy compound but produces instead a brittle, insoluble, infusible gel comprising a three-dimensional network of structural units composed of siloxane linkages as a result of the concurrent or subsequent loss of water from the intermediately formed hydroxy compound.

TYPE I

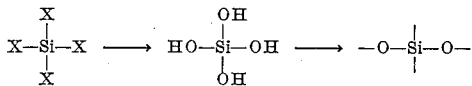

The formation of a siloxane linkage requires the close approach of two hydroxyl groups. It is apparent that, in the formation of such a rigid structure, many hydroxyl groups become isolated and block some of the possible cross linkages. As the structural network becomes more complicated, dehydration becomes increasingly more difficult, and the result is a partially dehydrated silica gel of poor dimensional stability.

Organo substituted silicanes of the type $RSiX_3$ are prepared by means of the well known Grignard reaction, where R may be any organic radicle which is capable of reacting with magnesium to form a Grignard reagent. Such organo substituted silicanes are also hydrolyzed on treatment with water, although the reaction is less vigorous than in the case of the unsubstituted silicanes under comparable conditions. Here, also concurrent dehydration or condensation with splitting out of water may occur so that a partially dehydrated product may result which can further be dehydrated by heat.

TYPE II

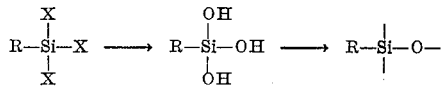

Here it will be seen that in each structural unit one of the four silicon bonds is blocked by the organic radicle R, and only three siloxane linkages can form. Such compounds are still capable of three-dimensional polymerization.

The chemical and structural changes occurring in this type of substituted silicane are the same as those described above in the formation of silica gel. The chief distinction arises from the fact that the property of solubility in organic solvents, particularly in the lower stages of condensation, is acquired due to the presence of the hydrocarbon radicle. The tendency of intermediate partially dehydrated products to further dehydrate is also decreased. The latter tendency is more noticeable with increasing size of the radicle. As the stage of essentially complete dehydration is approached, the mono-substituted products, which in reality are substituted silica gels, lose their solubility and become hard and brittle. However, there is a marked improvement in dimensional stability over silica gel.

On substituting a second organic radicle, which may or may not be different from the first, a compound of the type $RR'SiX_2$ results. Such compounds also may be hydrolyzed and dehydrated, the dehydration probably proceeding to some extent concurrently with the hydrolysis, particularly if the temperature is allowed to rise.

TYPE III

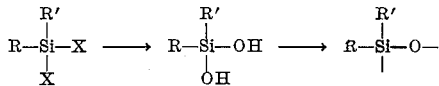

In each structural unit two of the four silicon bonds are now blocked by the organic radicles R and R', and only two siloxane linkages are possible. Hence a three-dimensional network is no longer possible and the resulting liquid or solid polymers can comprise only chain and cyclic structures. Intermediate crystalline dihydroxy compounds can in some instances be isolated. The final products which are usually resinous in character bear little physical resemblance to silica gel but are closely related thereto in chemical structure, differing only in the restriction of possible siloxane linkages.

Organo-substituted silicanes of the type

RR'R''SiX when hydrolyzed and dehydrated, yield very simple oxides in the structural unit of which three of the four silicon bonds are blocked by the organic radicles R, R' and R''.

TYPE IV

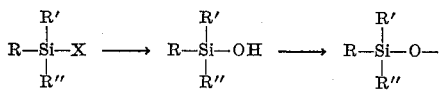

In this case, ease of hydrolysis is further diminished and in some cases the intermediate hydroxy silicanes can be isolated. The completely dehydrated product is dimeric because only one siloxane linkage can be formed. The dimers are either crystalline or liquid.

Prior attempts to utilize the above described reactions have not contemplated combinations thereof, but have been confined more or less to the individual reactions and their products. Such products, as shown above, have limited utility and the range of properties obtainable in the products of a given type of reaction is relatively restricted. For example, the product resulting from Type I reaction is an insoluble, infusible gel of little utility; Type IV reaction yields generally inert liquid products which, although they are soluble in organic solvents, cannot be polymerized beyond the dimer and hence cannot be utilized per se for coating compositions, resinous impregnants and the like.

An object of this invention is the production of new and useful products from these reactions which will have desirable predetermined properties.

Another object is to combine the above described reactions and thus to inter-condense the hydrolysis products of a plurality of substituted and unsubstituted organo silicanes.

Another object is to produce liquid products of varying viscosity.

Another object is to produce thermoplastic resinous products.

Another object is to produce thermosetting resinous products.

The new method comprises mixing predetermined quantities of two or more compounds of the types, $SiX_4$, $RSiX_3$, $RR'SiX_2$, and $RR'R''SiX$, where R, R′ and R″ are the same or different organic radicles and X is any hydrolyzable atom or group, or two or more compounds of any one of these types, except Type I, the organic radicle or radicles being different for each compound, and causing them to hydrolyze together and to become inter-condensed. This is best accomplished by introducing into the mixture by dropwise addition thereto the amount of water which is calculated for complete hydrolysis of the mixture and which preferably is dissolved in from two to four volumes of a common solvent such as alcohol, dioxan, acetic acid, acetone, etc. Although a difference in the reactivity of the various individual types of hydrolyzable compounds and a variation in the amounts present in the initial mixture may make it desirable to vary the conditions of the process, as will appear from a consideration of the accompanying examples, the above recited procedure in general is to be preferred. The use of a water miscible solvent for diluting the hydrolyzable mixture or the water or both and the dropwise addition of the water insures the maintenance of homogeneity during hydrolysis. Under these conditions condensation or the formation of siloxane linkages occurs concurrently with the hydrolysis, but it is to be understood that the extent of further subsequent dehydration is optional and will depend largely upon the use to which the product will be put.

In any hydrolyzable mixture of silicanes, one or more of which is organo substituted and contains from one to three hydrolyzable atoms or groups attached to the silicon atom, co-hydrolysis and dehydration by this method will result in inter-condensation or formation of interconnecting oxygen linkages between the silicon atoms of the various silicanes. The variety of the substituted organic radicles is limited only by their ability to form a Grignard reagent. In other words, the organo silicanes which may be employed in my process include all such compounds which contain one or more hydrolyzable atoms or groups and which may be prepared by means of the well known Grignard reaction. The radicles which may thus be substituted may include alkyl radicles such as methyl, ethyl, propyl, isopropyl, butyl, isobutyl, amyl, hexyl, heptyl, to octadecyl and higher; alicyclic radicles such as cyclopentyl, cyclohexyl, etc.; aryl and alkaryl radicles such as phenyl, mono- and poly-alkyl phenyls as tolyl, xylyl, mesityl, mono-, di- and tri-ethyl phenyls, mono-, di- and tri-propyl phenyls, etc.; naphthyl, mono- and poly-alkyl naphthyls, as methyl naphthyl, diethyl naphthyl, tripropyl naphthyl, etc.; tetrahydronaphthyl; anthracyl, etc.; aralkyl such as benzyl, phenylethyl, etc.; alkenyl such as methallyl, allyl, etc.

If the hydrolyzable group or groups of all of the compounds in the mixture to be hydrolyzed are halogens, it is preferable to employ dioxan as the solvent because it is inert to the halogens. If the mixture contains both halogens and alkoxy groups the former can be converted to the latter by the slow addition of dry alcohol to the mixture, or the mixture can be diluted with dioxan and treated with aqueous alcohol. When the mixture contains only alkoxy groups any water miscible solvent may be used together with a trace of acid such as HCl as catalyst. In this case, alcohol may be preferred on account of its relatively low cost. Mixtures of water miscible solvents may be used.

In the above described method, the slow incorporation of water into the homogeneous solution ensures that hydrolysis is not permitted to proceed unchecked, whereby the more reactive silicane or silicanes, that is, silicanes containing few or no substituted organic radicles per silicon atom, would be more completely hydrolyzed and condensed before the less reactive or more highly substituted silicanes have had an opportunity to react. On the contrary, the less reactive silicanes are thus given a greater opportunity to hydrolyze simultaneously with the more reactive silicanes than would be the case if the hydrolysis were conducted rapidly. Under these circumstances, simultaneous condensation of the various intermediate hydroxy compounds takes place and an intimate intermolecular combination through siloxane linkages of silicon atoms bearing different numbers and kinds of organic radicles becomes possible to the fullest extent. This insures a true inter-condensation with the formation of homogeneous products containing mixed unit structures.

After removal of solvent and excess water the hydrolysis products resulting from the above process are water-immiscible liquids of varying viscosity. They are soluble in the common organic solvents such as benzene, toluene, etc. Many of them are thermoplastic, some are thermosetting, and some are thermally stable liquids. Further condensation and polymerization may be brought about by heating, which generally results in an increase in viscosity and in some cases, if carried to completion, results in resinous solid products. The desired degree of polymerization will depend largely upon the contemplated use of the product and may be varied at will, since the final physical properties depend directly on the total number of siloxane linkages per molecule and the disposition of the siloxane linkages, this being controlled by the relative amounts of the various types of silicanes initially present.

The various classes of organo-siloxanes which can be produced by my method may be represented in the following manner as combinations of the various structural units, bearing in mind that the structural units are chemically combined with each other by siloxane linkages, that the percentage of each type of unit may be varied at will and that the properties of the resulting products will show corresponding variations which can be predicted in making compositions for a particular purpose.

*Class 1*

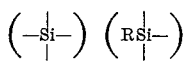

*Class 2*

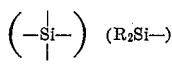

*Class 3*

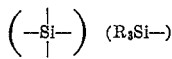

*Class 4*

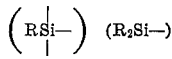

*Class 5*

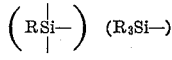

*Class 6*

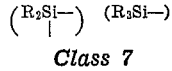

*Class 7*

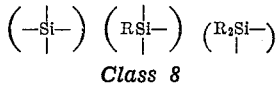

*Class 8*

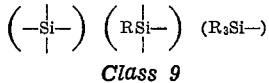

*Class 9*

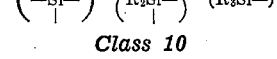

*Class 10*

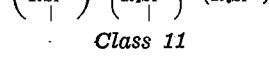

*Class 11*

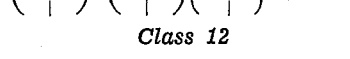

*Class 12*

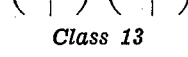

*Class 13*

*Class 14*

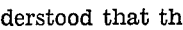

It is to be understood that the order in which the structural units of the various organo-siloxanes is represented has no significance because the units may be joined in a multiplicity of ways to form chain and cyclic structures and combinations thereof. Also, the organic radicle or radicles in each structural unit may be varied in kind.

The partially dehydrated organo-siloxanes or hydrolysis products, after removal of solvents, are generally liquids of various viscosities and they vary in the extent to which dehydration has occurred at this stage. The ease of dehydration and the physical properties of the completely condensed organo-siloxanes vary with the kind of substituted organic radicles and with their number or with the final ratio of oxygen to silicon. Subsequent heating is usually necessary for complete dehydration, particularly when the oxygen to silicon ratio is greater than one. The extent of heating necessary depends upon the ease of dehydration which in turn depends upon the molecular size of the organic radicle or radicles present and the number of possible siloxane linkages, that is, the final oxygen to silicon ratio. Products containing methyl radicles dehydrate more readily than those containing ethyl, propyl, etc., radicles or phenyl radicles and in general products containing alkyl radicles dehydrate more readily than those containing aryl radicles. Ease of dehydration also increases as the number of radicles per silicon atom increases or as the final oxygen to silicon ratio decreases. When this ratio is less than one, the organo-siloxanes are oils of relatively low viscosity. Their volatility decreases with increasing molecular size of the radicles and at the same time the viscosity may increase somewhat. As the final oxygen to silicon ratio increases from 1.0 to 1.3, there is a corresponding increase in molecular complexity or the number of siloxane linkages and an accompanying increase in viscosity. When the ratio is in the neighborhood of 1.3 and aryl radicles predominate, particularly on the mono-substituted silicon atoms, the viscosity increases to such an extent that the organo-siloxane is a thermoplastic solid which may be fused and solidified by repeated heating and cooling. As the oxygen to silicon ratio is increased to the neighborhood of 1.5 and beyond (approaching 2), the organo-siloxanes tend to become thermosetting and more particularly if the molecular size of the radicles is decreased.

Thus it will be seen that uniformity of behavior not only makes possible a wide variation in properties of the compositions, including viscosity, vapor pressure, melting range, setting rate, hardness, toughness, etc., but it also enables one to predict the most suitable combination of intermediate compounds for the production of an organo-siloxane for the desired purpose.

The following examples will illustrate the mode of operation of the process and the character of the resulting products. In the examples abreviations are used to designate certain radicles and groups thus: methyl (Me); ethyl (Et); ethoxy (OEt); phenyl ($\phi$); benzyl ($\phi$CH$_2$); $\beta$ phenyl ethyl ($\phi$CH$_2$CH$_2$); tolyl (Me$\phi$); zylyl (Me$_2\phi$).

CLASS 1

*Example 1*

Equi-molecular proportions of SiCl$_4$ and $\phi$Si(OEt)$_3$ were mixed and hydrolyzed by dropwise addition of aqueous alcohol. The resulting resin showed infinite electrical surface resistance and appeared to be unaffected by moisture. The resin fused when heated on a glass plate but did not become particularly brittle. After one-half hour of heating it showed signs of rapid thermosetting and became harder and more brittle, but did not crack on cooling.

Composition: $\left(-O\underset{|}{\overset{|}{Si}}O-\right)_1 \left(\phi\underset{|}{\overset{|}{Si}}O-\right)_1$; O/Si=1.75

Example 2

Equi-molecular proportions of ethyl orthosilicate and methyl triethoxy silicon were mixed and treated with a mixture of one part by volume of concentrated HCl and 9 parts of water. The mixture was shaken until it had become homogeneous, the liberated alcohol acting as a solvent. The resulting solution gave clear films on glass which flaked when drying was practically complete, due to its very rapid setting character.

Composition: $\left(-O\underset{|}{\overset{|}{Si}}O-\right)_1 \left(Me\underset{|}{\overset{|}{Si}}O-\right)_1$; O/Si=1.75

Example 3

Ethyl orthosilicate was mixed with methyl triethoxy silicon in the molar ratio of 1/3. The calculated amount of 5% HCl was added and the mixture was shaken until it became homogeneous. Films of this material on glass crazed on drying out, due to rapid setting.

Composition: $\left(-O\underset{|}{\overset{|}{Si}}O-\right)_1 \left(Me\underset{|}{\overset{|}{Si}}O-\right)_3$; O/Si=1.62

Example 4

A mixture of orthosilicate and methyl triethoxy silicon in the molar ratio 33/1 was treated with 5% HCl and the mixture was shaken until it had become homogeneous. Gelation and syneresis gave a slightly cloudy resin closely similar to silica gel.

Composition: $\left(-O\underset{|}{\overset{|}{Si}}O-\right)_{33} \left(Me\underset{|}{\overset{|}{Si}}O-\right)_1$; O/Si=2.99

Example 5

Silicon tetrachloride and benzyl silicon trichloride were mixed in the molar ratio 3/1. The mixture was diluted with an equal volume of dioxane. 0.04 mole of water in an equal volume of dioxane were added dropwise to the solution of chlorides. The mixture was concentrated under reduced pressure. The resulting resin set very rapidly, is brittle and becomes insoluble in dioxane on standing in the manner of silicic acid itself.

Composition: $\left(-O\underset{|}{\overset{|}{Si}}O-\right)_3 \left(\phi\underset{|}{\overset{|}{Si}}O-\right)_1$; O/Si=1.87

Example 6

Benzyl silicon trichloride and silicon tetrachloride were mixed in equi-molecular proportions. The mixture was then diluted with an equal volume of dry dioxane, water was mixed with an equal volume of dioxane and the mixture was added dropwise and slowly to the well agitated solution of the chlorides. A faint turbidity indicated the completion of the co-polymerization. The resulting solution was concentrated under reduced pressure. The product was a very viscous liquid showing rapid set at 180° C. On heating a film of this material 24 hours at 40° to 50° C. a water clear and rather frangible resin results.

Composition: $\left(-O\underset{|}{\overset{|}{Si}}O-\right)_1 \left(\phi CH_2\underset{|}{\overset{|}{Si}}O-\right)_1$; O/Si=1.75

CLASS 2

Example 7

Approximately 0.28 mole of ethyl silicate was mixed with approximately 0.25 mole of Et₂SiCl₂. Aqueous alcohol was added to bring about hydrolysis under homogeneous conditions. A viscous oily liquid resulted on evaporation of the solvent. On further heating gelation occurred quite rapidly leaving a rubbery resin which became somewhat brittle on further heating.

Composition: $\left(-O\underset{|}{\overset{|}{Si}}O-\right)_{1:1} (Et_2SiO-)_1$; O/Si=1.60

Example 8

Approximately .045 mol of ethyl silicate was mixed with approximately 0.15 mol of Et₂SiCl₂ and treated with aqueous alcohol. On evaporation an oily liquid remained, which set up slowly on extended heating on a glass plate to leave a non-brittle coating.

Composition: $\left(-O\underset{|}{\overset{|}{Si}}O-\right)_1 \left(Et_2SiO-\right)_{3.4}$; O/Si; 1.20

Example 9

A mixture of 5.1 parts by weight of SiCl₄ and 6.28 parts by weight of Et₂SiCl₂ was converted to esters by dropping in dry alcohol. Hydrolysis was accomplished by dropwise addition of 3 parts by weight of H₂O diluted with four or five volumes of ethyl alcohol. Two liquid phases separated. The aqueous layer was removed. An extremely viscous tacky liquid resulted. This was dissolved in toluene for use in impregnation. A sample applied to glass fibre tape showed infinite electrical resistance. A sample heated on a glass plate at 180°–190° C. for a half-hour was still a clear viscous liquid. After finally setting up on glass fibre tape by additional heating, the resin was hard and tough, but not brittle.

Composition: $\left(-O\underset{|}{\overset{|}{Si}}O-\right)_3 \left(Et_2SiO-\right)_4$; O/Si=1.43

Example 10

Equi-molecular proportions of φ₂SiCl₂ and SiCl₄ were mixed. To this mixture dry methyl alcohol was added slowly and HCl was evolved. Aqueous alcohol was added to cause hydrolysis. Some toluene was then added to dissolve the resulting resin and excess water and toluene was removed by boiling. The resulting liquid product was applied to a glass plate and after two or three hours of heating at 180°–190° C. the resin was still plastic while hot, but had lost its tackiness and showed a tendency to thermoset. On cooling it cracked from the glass, due to its difference in expansion from that of the glass.

Composition: $\left(-O\underset{|}{\overset{|}{Si}}O-\right)_1 (\phi_2SiO-)_1$; O/Si=1.50

Example 11

0.54 gram of φ₂Si(OH)₂ was mixed with 0.45 gram of SiCl₄ by dissolving in benzene. After boiling for a few minutes and allowing to stand overnight, crystals of the diol no longer separated out. A sample on a glass square at approximately 180°–190° C. for two hours became a hard rather brittle resin, as in Example 10, after cooling to room temperature.

Composition: $\left(-O\underset{|}{\overset{|}{Si}}O-\right)_{1.1} (\phi_2SiO-)_1$; O/Si=1.52

Example 12

A mixture of SiCl₄ and φ₂SiCl₂ in the approximate molar ratio of 1/1.8 was diluted with dioxane. Moist air was then passed through the solution. After 18 hours hydrolysis appeared to be complete. A very viscous sticky mass remained which set quite rapidly with heating to a resin which was rather rubbery while hot, but hard and slightly brittle when cold. Further heating further advanced the set.

Composition: 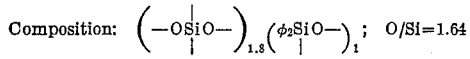 ; O/Si=1.64

Example 13

Three molecular parts of $\phi_2SiCl_2$ were mixed with one molecular part of $SiCl_4$. Dry methyl alcohol was then added to form the esters. It was diluted with acetone and aqueous acetone was then added dropwise. A viscous sticky mass remained on evaporation. It appeared perfectly homogeneous, and lost its tackiness, forming a hard thermoplastic resin on heating 24 hours.

Composition: 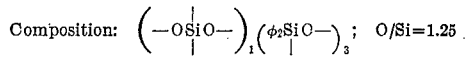 ; O/Si=1.25

Example 14

A mixture of $SiCl_4$ and $\phi EtSiCl_2$ in the molar ratio 1/4 was hydrolyzed by adding glacial acetic acid. The oily product became resinous after extensive heating on the hot plate at 180°–190° C.

Composition: 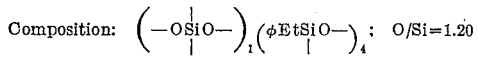 ; O/Si=1.20

Example 15

Equi-molecular proportions of $Si(OEt)_4$ and $Me_2Si(OEt)_2$ were mixed and co-polymerized by adding dropwise the calculated amount of water containing a trace of HCl and vigorously shaking the mixture. Evaporation gave a very viscous liquid, which gelled rapidly with further heating giving a weak rubbery resin which crumbled readily. A sample on a glass plate with moderate warming began to craze and flake off. When the initial hydrolysis mixture was rapidly treated with an excess of water, co-polymerization did not occur but a gel similar to silica gel was precipitated.

Composition: $\left(-O\underset{|}{Si}O-\right)_1\left(Me_2SiO-\right)_1$ ; O/Si=1.50

Example 16

A co-polymer was prepared from $Si(OEt)_4$ and $Me_2Si(OEt)_2$ in the molecular proportions of 1/3 by dropping in somewhat more than the calculated amount of water containing a trace of HCl. After evaporation, a transparent viscous oil remained which set very slowly and became a rubbery rather weak gel only after thirty-six hours of heating at 190° C.

Composition: 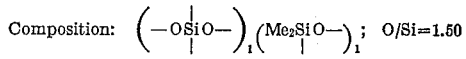 ; O/Si=1.25

Example 17

.1 mol of $Si(OEt)_4$ and .2 mol of $Me_2Si(OEt)_2$ were mixed and to the mixture was added dropwise the calculated amount of water (containing a drop of concentrated HCl) for complete hydrolysis. A viscous clear solution remained. After evaporation of the solvent a clear extremely tacky mass was left. A sample heated on a glass plate at 190° C. was still fluid after 2–3 hours. On heating for 20 hours it finally gelled to a slightly rubbery film.

Composition: 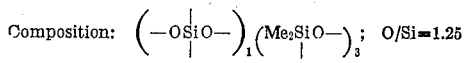 ; O/Si=1.33

Example 18

Co-polymerization of $Si(OEt)_4$ and $\phi EtSiCl_2$ was carried out in dioxane. The ratio was 2/3. A tacky soft resin remained, which set quite rapidly with heating. After an hour at 190°–200° C. it formed a tough resilient transparent film.

Composition: 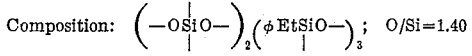 ; O/Si=1.40

Example 19

The co-polymerization of $Si(OEt)_4$ and $\phi_2SiCl_2$ was carried out in a dioxane using the molar ratio of 2/3. After removal of solvent the material was a viscous sticky liquid. After heating at 190°–200° C. for half an hour it showed signs of setting and was a non-tacky non-brittle resin at room temperature. On heating at around 200° C. for 72 hours, further setting occurred and the resin became hard and somewhat brittle.

Composition: 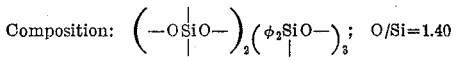 ; O/Si=1.40

CLASS 3

Example 20

Two molar proportions of $\phi Me_2SiCl$ and one of $SiCl_4$ were mixed and diluted with two volumes of dioxane. This solution was then added dropwise to a solution of one part by volume of water in three parts of dioxane. On evaporation a viscous oil remained in which some free silica was suspended. In comparison, two molecular parts of $\phi Me_2SiCl$ was esterified by dropping in alcohol. One part of $Si(OEt)_4$ was then added and the mixture treated dropwise with water. The product was a homogeneous viscous oil which remained unchanged on heating for half an hour at 180° C.

Composition: 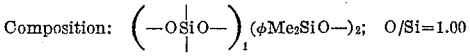 ; O/Si=1.00

Example 21

$SiCl_4$ and $\phi Me_2SiCl$ were mixed in the molar ratio 1/3. After dilution with two volumes of dioxane, aqueous dioxane was added with great care. In spite of precautions a considerable amount of silica precipitated out showing clearly that satisfactory inter-condensation had not occurred. On evaporation, however, the liquid portion was somewhat more viscous than the oil obtained from $\phi Me_2SiCl$ alone. This behavior is undoubtedly due to the wide difference in reactivity of the $SiCl_4$ and the trisubstituted halide.

To avoid this difficulty a mixture of halides of the same composition were again diluted with dioxane. To this mixture glacial acetic acid was then added. There was no sign of precipitation. Some HCl was evolved after adding a volume of glacial acetic acid approximately equal to the original halide mixture and warming gently, another volume of aqueous acetic acid (1/3) was added with further warming. On evaporation of solvent an oil of medium viscosity resulted. This oil showed no tendency to body or change with heating at 180° C. for 20 hours.

Composition: 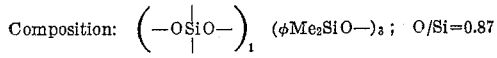 ; O/Si=0.87

Example 22

A mixture of $SiCl_4$ with $\phi Me_2SiCl$ in the molecular ratio 5/8 was diluted with an equal volume of dioxane. Another volume of glacial acetic acid was added. Another volume of aqueous acetic (1/3) was added dropwise with warming. The solvent was then evaporated in vacuo leaving a medium viscosity liquid, which became slightly more viscous after two hours at 190° C.

Composition: 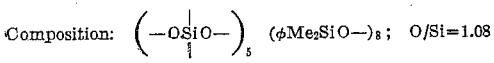 ; O/Si=1.08

Example 23

To a solution of φMe$_2$SiOEt and Si(OEt)$_4$ in the molar proportions 2/1, 95% ethyl alcohol containing a few drops of concentrated hydrochloric acid was added slowly with warming to effect hydrolysis and inter-condensation. Water was then added in excess to carry the reaction to completion. After evaporating off the solvents a slightly viscous liquid was obtained. A sample applied to a glass plate and heated at 190° C. for seventy-two hours remained quite tacky.

Composition: $\left(-O\underset{|}{Si}O-\right)_1$ (φMe$_2$SiO—)$_2$; O/Si=1.00

CLASS 4

Example 24

φSiCl$_3$ and Et$_2$SiCl$_2$ in the molar ratio of 1/1.2 were mixed. Alcohol was slowly added dropwise to convert the chlorides to esters. Aqueous alcohol was then added to hydrolyze the esters. On evaporating the solvent, a viscous oily liquid remained, which comprised a partially dehydrated co-polymer of mono-phenyl silicon oxide and diethyl silicone, and which became somewhat more viscous on further heating at 190°–200° C.

Composition: $\left(\phi\underset{|}{Si}O-\right)_1 \left(Et_2\underset{|}{Si}O-\right)_{1.2}$; O/Si=1.23

Example 25

After mixing 2.1 grams of φSiCl$_3$ with 9.12 grams of φ$_2$SiCl$_2$ the mixture was divided into two portions. A portion was poured into water in excess. After standing overnight a very viscous tacky resinous mass had precipitated. Aqueous ispropyl alcohol was added to the other portion dropwise. Toluene was added and the solution boiled to drive out excess water and alcohol. A liquid remained which was viscous but not tacky. Impregnated glass fibre tape samples were prepared from both materials. The former hardened very rapidly on heating and became brittle; the latter set slowly to some extent but remained flexible.

Composition: $\left(\phi\underset{|}{Si}O-\right)_1 \left(\phi_2\underset{|}{Si}O-\right)_{3.6}$; O/Si=1.11

Example 26

Et$_2$SiCl$_2$ was mixed with φSiCl$_3$ in the molar ratio of 1.87/1 and diluted with dioxane. Aqueous dioxane was then added to bring about hydrolysis and co-polymerization. On evaporation of solvent a very tacky viscous liquid remained. It was perfectly homogeneous and showed little change on passing air through it at 260° C. for three or four hours. Only after seven or eight hours further treatment had the viscosity increased noticeably. It was now a thermoplastic resin rather hard and non-tacky in the cold.

Composition: $\left(\phi\underset{|}{Si}O-\right)_1 \left(Et_2\underset{|}{Si}O-\right)_{1.87}$; O/Si=1.17

Example 27

A mixture of φSiCl$_3$ and Et$_2$SiCl$_2$ in the approximate molar ratio of 1/1.2 was diluted with dioxane and the mixture hydrolyzed with aqueous dioxane. After removal of solvent and excess water the resulting soft thermoplastic resin was harder and somewhat more brittle at room temperature than the final product in Example 24, but became more fluid when heated to temperatures around 200° C.

Composition: $\left(\phi\underset{|}{Si}O-\right)_1 \left(Et_2\underset{|}{Si}O-\right)_{1.2}$; O/Si=1.23

Example 28

0.2 mol of φEtSiCl$_2$ was mixed with 0.3 mol of EtSiCl$_3$, diluted with dioxane and hydrolyzed and co-polymerized by slowly adding aqueous dioxane. On adding benzene and evaporating a very viscous liquid remained. A sample applied to glass fibre tape was heated for three to four hours, at 220° C., after which time it was still flexible. When the EtSiCl$_3$ and φEtSiCl$_2$ were used in the ratio of 2/1 and co-polymerization carried out in the same manner the initial liquid was definitely more viscous and, with heating, solidified more rapidly. On application to glass fibre tape this resin was stiff and hard. The resin obtained from EtSiCl$_3$ and φEtSiCl$_2$ in the ratio 7/1 set up quite rapidly on heating at 190°–220° C., although it passed through a rubbery flexible gel stage. An impregnated tape sample became too stiff. The mixture of two mols of φEtSiCl$_2$ with three parts of EtSiCl$_3$ therefore appeared to produce the best combination for the impregnation of glass fibre tape.

Composition: $\left(Et\underset{|}{Si}O-\right)_3 \left(\phi Et\underset{|}{Si}O-\right)_2$; O/Si=1.30

Example 29

Some EtSiCl$_3$ and Et$_2$SiCl$_2$ were mixed in the molecular ratio 6/4 and hydrolyzed and co-polymerized by diluting with dioxane and adding aqueous dioxane and then evaporating the solvent. Passing air through the resulting viscous liquid at 180°–190° C. caused the viscosity to increase. Five to eight hours of such treatment caused setting to a rubbery insoluble gel.

Composition: $\left(Et\underset{|}{Si}O-\right)_3 \left(Et_2\underset{|}{Si}O-\right)_2$; O/Si=1.30

Example 30

A mixture of 0.8 mol of MeSi(OEt)$_3$ and 0.2 mol of Me$_2$Si(OEt)$_2$ were hydrolyzed and co-polymerized by adding the calculated amount of water with a drop of concentrated HCl and shaking. On evaporation a liquid remained which on heating on a glass square at 190° C. for 20 minutes gave a hard transparent film of remarkable clarity, which was quite resistant to scratching and did not loosen from the glass nor turn white after three hours heating in water at 80°–90° C.

Composition: $\left(Me\underset{|}{Si}O-\right)_4 \left(Me_2\underset{|}{Si}O-\right)_1$; O/Si=1.40

Example 31

A mixture of φSi(OEt)$_3$ and Me$_2$Si(OEt)$_2$ in the molar ratio of 3/2 was co-polymerized by slowly adding water. The hydrolysis furnished the water miscible solvent, ethyl alcohol. Heat was developed and an oily layer separated out. The product was a very viscous liquid, which thermoset slowly by heating, and on an iron plate was converted to a tough, insoluble film at 200° C.

Composition: $\left(\phi\underset{|}{Si}O-\right)_3 \left(Me_2\underset{|}{Si}O-\right)_2$; O/Si=1.30

Example 32

0.1 mol of φSiCl$_3$ was mixed with 0.05 of a mol of Me$_2$Si(OEt)$_2$ and treated dropwise with water diluted with two volumes of alcohol. Turbidity developed and a clear homogeneous oily liquid separated which was dried by warming in a vacuum. A thin film on glass set only after 15 hours at 190° C. to a tough clear film. Heated in bulk for 18 hours at the same temperature, it remained unchanged. It is a thermoplastic resin and its behaviour when used for cementing glass plates indicated its vaule as an optical cement.

As evidence of co-polymerization, it was found that the product resulting from the hydrolysis of $\phi SiCl_3$ alone is immiscible with the product resulting from the hydrolysis of $Me_2Si(OEt)_2$ alone.

Composition: $\left(\phi\overset{|}{\underset{|}{Si}}O-\right)_2 \left(Me_2SiO-\right)_1$; O/Si=1.33

Example 33

$MeSi(OEt)_3$ and $Me_2Si(OEt)_2$ in the molar ratio of 6/4 were mixed and hydrolyzed by dropwise addition of water with a trace of HCl as cataylst. On evaporation the remaining liquid co-polymer was quite fluid. After approximately twenty minutes heating at 180°–190° C. it gelled and set-up. Dimethyl silicone is soluble in alcohol but treatment of the gel with alcohol failed to remove it, showing that co-polymerization had occurred.

Composition: $\left(Me\overset{|}{\underset{|}{Si}}O-\right)_3 \left(Me_2SiO-\right)_2$; O/Si=1.30

Example 34

0.8 mol of $MeSi(OEt)_3$ and 0.2 mol of $Me_2Si(OEt)_2$ were hydrolyzed and co-polymerized by adding dropwise the requisite amount of water with at race of HCl as cataylst, the alcohol formed in hydrolysis serving as the water miscible solvent. Evaporation at low temperatures left a viscous liquid. Application to glass and metal as a lacquer in solution in alcohol gave hard tough films with suitable baking.

Composition: $\left(Me\overset{|}{\underset{|}{Si}}O-\right)_4 \left(Me_2SiO-\right)_1$; O/Si=1.40

Example 35

A mixture of $\phi_2SiCl_2$ and $MeSi(OEt)_3$ in equimolecular proportions on dilution with dioxane and treatment with aqueous dioxane in the usual manner gave an extremely viscous soft resin. After twenty hours heating at 190° C. it shows no signs of thermosetting and gives a nice clear film on the glass, which shows no sign of cracking. It can again be fused by heating to 190° C.

Composition: $\left(Me\overset{|}{\underset{|}{Si}}O-\right)_1 \left(\phi_2SiO-\right)_1$; O/Si=1.25

Example 36

A mixture of $MeSi(OEt)_3$ and $\phi_2SiCl_2$ in the molar ratio of 2/1 was diluted with an equal volume of dioxane and then treated dropwise with aqueous dioxane until turbidity resulted. The resulting resin was fluid at 190° C. but non-tacky at room temperature. After heating for twenty hours it had become solid at 190° C. forming a good film which showed no tendency to crack off the plate.

Composition: $\left(Me\overset{|}{\underset{|}{Si}}O-\right)_2 \left(\phi_2SiO-\right)_1$; O/Si=1.33

Example 37

Another resin formed in the same manner from $MeSi(OEt)_3$ and $\phi_2SiCl_2$ in the molecular ratio of 4/1 gave a tough clear adherent film which was solid at 190° C. after only two hours of heating.

Composition: $\left(Me\overset{|}{\underset{|}{Si}}O-\right)_4 \left(\phi_2SiO-\right)_1$; O/Si=1.40

Examples 36 and 37 show quite clearly how the physical character of the products for a given pair of intermediates can be controlled and predetermined in using my method of co-polymerization.

Example 38

A mixture of equi-molecular parts of $EtSiCl_3$ and $\phi MeSi(OEt)_2$ was diluted with an equal volume of dioxane. A mixture of water in two volumes of dioxane was then dropped slowly in with a fine pipette with vigorous stirring until a permanent cloudiness appeared. The solvent was then removed in a vacuum. A viscous soft resin remained. The material became slightly more viscous on heating overnight at 190° C., but remained a viscous tacky liquid at room temperature, which became more fluid on heating.

Composition: $\left(Et\overset{|}{\underset{|}{Si}}O-\right)_1 \left(\phi MeSiO-\right)_1$; O/Si=1.25

Example 39

$EtSiCl_3$ and $Me_2Si(OEt)_2$ were mixed in the molar ratio 2/1. After dropwise treatment with water followed by removal of by-products a very viscous sticky resin remained, which gradually became harder and lost its tackiness with further heating, but did not get brittle. It should make a satisfactory baking enamel.

Composition: $\left(Et\overset{|}{\underset{|}{Si}}O-\right)_2 \left(Me_2SiO-\right)_1$; O/Si=1.33

Example 40

7 gms. of anhydrous ethyl alcohol were added to 1 gm. of dibenzyl silicon dichloride and 6.7 grams of phenyl silicon trichloride. When the evolution of HCl was largely completed 11 grams of Cellosolve were added. 1.8 grams of water were added in four portions with shaking. The resulting solution was concentrated. After heating two hours at 175° C. the material was liquid while hot and was a soft resin at room temperature. Set to a brittle resin occurred after twelve hours heating at 175° C.

Composition: $\left(\phi\overset{|}{\underset{|}{Si}}O-\right)_{10} \left((\phi CH_2)_2SiO-\right)_1$; O/Si=1.45

Example 41

1 gram of dodecyl silicon trichloride was mixed with 9.3 grams of dimethyl diethoxy silicon. 0.2 cc. of anyhdrous ethyl alcohol were added and the mixture was then refluxed for about ten minutes. A like volume of mixed concentrated aqueous HCl and 95% ethyl alcohol in equal volumetric proportions was added and the resulting solution was refluxed for thirty minutes. An oil separated which had better lubricating properties as measured on a Prony brake than did dimethyl silicone alone.

Composition: $\left(C_{12}H_{25}\overset{|}{\underset{|}{Si}}O-\right)_1 \left(Me_2SiO-\right)_{22}$; O/Si=1.02

Example 42

0.01 mol of $\phi SiCl_3$ and 0.02 mol of $Me_2Si(OEt)_2$ were mixed. 1 cc. of dry dioxane was added. 0.03 mole of 95% ethyl alcohol was added to convert the chloride to ester. 0.05 mol of water containing a slight amount of HCl diluted with 1 cc. of dioxane was added dropwise. The solvents were driven off by heating to yield a very viscous liquid unaffected by heat at 180° C., which is of interest as an electrical insulating oil.

Composition: $\left(\phi\overset{|}{\underset{|}{Si}}O-\right)_1 \left(Me_2SiO-\right)_2$; O/Si=1.17

Example 43

Equimolecular parts of benzyl methyl diethoxy silicon and MeSi(OEt)$_3$ were mixed; the mixture was then diluted with two volumes of dioxane. Somewhat more than the calculated amount of water containing 4% of hydrochloric acid was diluted with five volumes of dioxane. This latter solution was added dropwise to the well agitated solution of the esters. The resulting solution was concentrated under reduced pressure. The co-polymer is a very viscous liquid. Two hours heating at 180° C. caused loss of tackiness. The resulting resin was a moderately flexible clear colorless resin.

Composition: $\left(Me\overset{|}{\underset{|}{Si}}O-\right)_1 \left(\phi CH_2 MeSiO-\right)_1$; O/Si=1.25

Example 44

One molar part of benzyl methyl diethoxy silicon and two of MeSi(OEt)$_3$ were mixed. Co-polymerization was carried out by diluting with dioxane and adding acidified aqueous dioxane dropwise. Evaporation left a viscous liquid which was a slightly tacky resin for the first ten minutes of heating at 180° C. After two hours of heating a hard transparent resin resulted.

Composition: $\left(Me\overset{|}{\underset{|}{Si}}O-\right)_2 \left(\phi CH_2 MeSiO-\right)_1$; O/Si=1.33

Example 45

Equi-molecular parts of Me$\phi$Si(OEt)$_3$ and Me$_2$Si(OEt)$_2$ were mixed. Slightly more than the calculated amount of water was added dropwise, both the ester mixture and the water being diluted with dioxane before mixing. The resulting product on freeing from solvents is a soft resin. Films of this material set to a hard tough coat on glass after baking one and a half hours at 180° C.

Composition: $\left(Me\phi SiO-\right)_1 \left(Me_2SiO-\right)_1$; O/Si=1.25

Example 46

A mixture of equi-molecular parts of EtSiCl$_3$ and $\phi$EtSiCl$_2$ was diluted with an equal volume of dioxane and aqueous dioxane (1/2) was added dropwise with vigorous shaking until a permanent turbidity developed. After removing the solvent and any excess water by vacuum treatment at room temperature an oil of medium viscosity remained. It was quite fluid at 200° C. and its viscosity was little affected in one to two hours of heating.

Composition: $\left(Et\overset{|}{\underset{|}{Si}}O-\right)_1 \left(\phi EtSiO-\right)_1$; O/Si=1.25

Example 47

A mixture of EtSiCl$_3$ and $\phi$EtSiCl$_2$ in the molar ratio 2/1 was diluted with dioxane, treated dropwise with aqueous dioxane while warming and shaking vigorously, and finally evaporated in vacuo. The resulting co-polymer was much more viscous than that obtained from equi-molecular quantities of the same starting materials. On heating for 18 hours at around 200° C., it was a slightly tacky soft resin.

Composition: $\left(Et\overset{|}{\underset{|}{Si}}O-\right)_2 \left(\phi EtSiO-\right)_1$; O/Si=1.33

Example 48

A mixture of EtSiCl$_3$ and $\phi$EtSiCl$_2$ in the molar ratio of 4/1 was co-polymerized in the manner described in the preceding example. An extremely viscous tacky liquid resulted which showed definite signs of thermosetting after two hours at 190°–200° C., becoming a soft somewhat plastic resin which could be further set by continued heating.

Composition: $\left(Et\overset{|}{\underset{|}{Si}}O-\right)_4 \left(\phi EtSiO-\right)_1$; O/Si=1.40

Example 49

MeSi(OEt)$_3$ and $\phi$MeSi(OEt)$_2$ were mixed in the molar ratio 3/2 and co-polymerized as before. Evaporation of solvent left an extremely viscous tacky fluid. Its viscosity increased readily to a noticeable extent on heating around 200° C. There was no further noticeable change after two hours heating and on cooling a slightly tacky thermoplastic resin remained. Compare Example 48 having Et in place of Me.

Composition: $\left(Me\overset{|}{\underset{|}{Si}}O-\right)_3 \left(\phi MeSiO-\right)_2$; O/Si=1.30

Example 50

Some $\phi$SiCl$_3$ and $\phi$MeSi(OEt)$_2$ were mixed in the molar ratio 3/1. After co-polymerization an extremely viscous soft resin remained, which was a very viscous sticky liquid after two hours at 190° C. After 20 hours heating, it was slightly soft and tacky while hot, but non-tacky and rather hard and brittle at room temperature.

Composition: $\left(\phi\overset{|}{\underset{|}{Si}}O-\right)_3 \left(\phi MeSiO-\right)_1$; O/Si=1.37

Example 51

The co-polymerization of MeSi(OEt)$_3$ and $\phi$EtSiCl$_2$ was carried out in dioxane in the molar ratio 3/1. The very viscous liquid was definitely thermosetting and after one hour at 190°–200° C. it formed a tough leathery film.

Composition: $\left(Me\overset{|}{\underset{|}{Si}}O-\right)_3 \left(\phi EtSiO-\right)_1$; O/Si=1.37

Example 52

To a solution of $\phi$CH$_2$SiCl$_3$ and Me$_2$Si(OEt)$_2$ in equimolar proportions was added slowly 95% ethyl alcohol to effect hydrolysis and inter-condensation. Water is then added in slight excess to complete the reaction. After boiling off the solvents, the resulting viscous oil hardened somewhat at 190° C., but remained a thermoplastic resin unchanged by further excessive heating.

Composition: $\left(\phi CH_2\overset{|}{\underset{|}{Si}}O-\right)_1 \left(Me_2SiO-\right)_1$; O/Si=1.25

Example 53

To a solution of $\phi$CH$_2$CH$_2$SiCl$_3$ and Me$_2$Si(OEt)$_2$ in the molar proportions 1/2 was added slowly 95% ethyl alcohol to effect hydrolysis and inter-condensation. Water was then added in slight excess to complete the reaction. After boiling off the solvents, the concentrated product gave an excellent tough hard resinous film in two hours at 190° C.

Composition: $\left(\phi CH_2CH_2\overset{|}{\underset{|}{Si}}O-\right)_1 \left(Me_2SiO-\right)_2$; O/Si=1.17

Example 54

To a solution ($\phi$CH$_2$)$_2$SiCl$_2$ and MeSi(OEt)$_3$ in the molar proportions 1/2 was added slowly 95% ethyl alcohol to effect hydrolysis and inter-condensation. Water was then added in slight excess to complete the reaction. After boiling off the solvents and in three hours at 190° C. a tough hard thermoplastic resinous film was obtained. In 20 hours at 190° C. the film had set, but remained tough.

Composition: 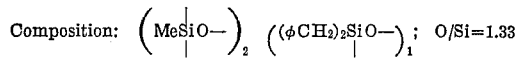

Example 55

$(\phi CH_2)_2Si(OH)_2$ and $C_{12}H_{25}SiCl_3$ in equi-molar proportions were mixed and alcohol was added as solvent. Water was then added in slight excess to complete the reaction. After boiling off the solvents, the oily product gives a hard resinous film in two hours at 190° C.

Composition: 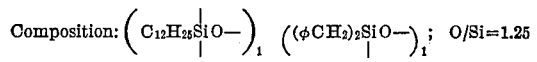

Example 56

To a solution of $\phi CH_2(Me)Si(OEt)_2$ and $MeSi(OEt)_3$ in the molar proportions 1/3, 95% ethyl alcohol containing a few drops of concentrated hydrochloric acid was added slowly with warming to effect hydrolysis and co-polymerization. Water was then added in excess to carry the reaction to completion. After evaporating the solvents, the concentrated residual oil was applied to a glass plate and heated at 190° C. In two hours a rough, yet soft and flexible thermoplastic resin was obtained. The film set further in twenty additional hours, but retained its softness and flexibility.

Composition: 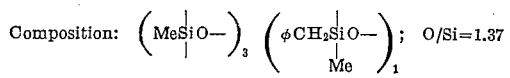

Example 57

To a solution of $\phi CH_2CH_2(Me)Si(OEt)_2$ and $MeSi(OEt)_3$ in the molar proportions 1/4, 95% ethyl alcohol containing a few drops of concentrated hydrochloric acid was added slowly with warming to effect hydrolysis and co-polymerization. Water was then added in excess to carry the reaction to completion. After evaporating the solvents, the concentrate set in one hour at 190° C., and after three more hours at this temperature was soft and crumbly.

Composition: 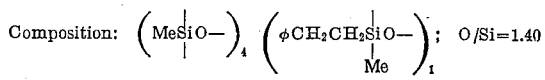

Example 58

When the same compounds as in the preceding example but in the molar proportions 2/3 are co-polymerized as before, a somewhat better product is obtained. The resin is thermosetting and hardens after three hours at 180° C.

Composition: 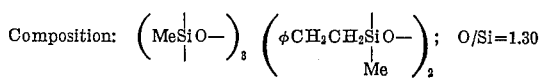

Example 59

To a solution of $\phi CH_2CH_2(Me)Si(OEt)_2$ and $\phi SiCl_3$ in the molar proportions 1/2 was added slowly 95% ethyl alcohol to effect hydrolysis and inter-condensation. Water was then added in slight excess. After boiling off the solvents, an excellent hard tough thermosetting resin was obtained at 190° C. in two hours, remaining non-brittle after twenty more hours at 190°. It is superior to the thermosetting resins obtained in two hours at 180° by either component alone.

Composition: 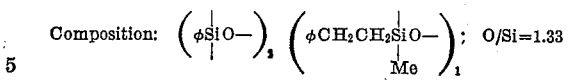

Example 60

To a solution of $MeSi(OEt)_3$ and $\phi CH_2(\phi)SiCl_2$ in the molar proportions 3/1 was added slowly 95% ethyl alcohol to effect hydrolysis and inter-condensation. Water was then added slowly in slight excess to complete the reaction. After boiling off the solvents, an excellent tough hard resinous film was obtained in three hours at 180°. In less than twenty hours the film had set, but remained non-brittle.

Composition: 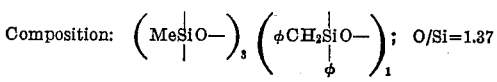

Example 61

To a solution of $\phi CH_2SiCl_3$ and $\phi CH_2(\phi)Si(OH)_2$ in the molar proportions 2/1 was added slowly 95% ethyl alcohol to effect hydrolysis and inter-condensation. Water was then added in slight excess to complete the reaction. When the solvent was boiled off and the co-polymer was heated at 190° C. it became a thermoplastic resin.

Composition: 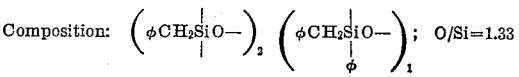

Example 62

A solution of $\phi SiCl_3$ and $\phi CH_2(\phi)SiCl_2$ in the molar proportions 3/1 was diluted with approximately twice its volume of dioxane and then hydrolyzed and inter-condensed by the slow additions of a 1:3 solution of water in dioxane. After removing the solvent, a thermoplastic resinous film was formed in air hours at 190° C. After twenty-four hours at 190° the film was still slightly tacky.

Composition: 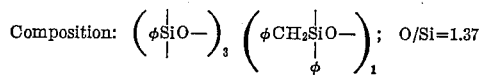

Example 63

A mixture of $\phi CH_2(\phi)Si(OH)_2$ and $CH_2=C(CH_3)CH_2SiCl_3$ in equimolar proportions was diluted with approximately twice its volume of dioxane and then hydrolyzed and inter-condensed by the slow addition of a 1:3 solution of water in dioxane. After removing the solvent, a tough hard thermoplastic film was obtained in four hours at 190° C.

Composition:

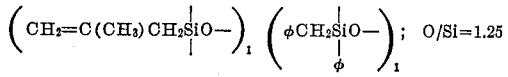

Example 64

A solution of $CH_2=CHCH_2SiCl_3$ and $(CH_2=CHCH_2)_2SiCl_2$ in equimolar proportions was diluted with approximately twice its volume of dioxane and then hydrolyzed and inter-condensed by the slow additions of a 1:3 solution of water in dioxane. After removing the solvent, the concentrated oil set in one-half hour to a hard crumbly resin resembling amorphous silica. (Some allyl groups are removed by heating in air.)

Composition:
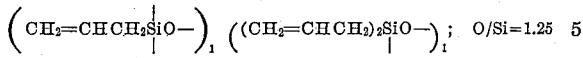

Example 65

To a solution of $Me_2Si(OEt)_2$, $$CH_2=C(CH_3)CH_2SiCl_3$$

and $(CH_2=C(CH_3)CH_2)_2SiCl_2$ in equimolar proportions was added slowly 95% ethyl alcohol to effect hydrolysis and inter-condensation. Water was then added in slight excess to complete the reaction. After boiling off the solvents and heating, a tough hard resinous film was formed in three hours at 190° C., and remained about the same after twenty additional hours at this temperature. (Methallyl compounds alone give a very brittle and crumbly resin.)

Composition: 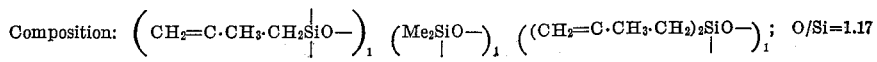

Example 66

A solution of $\phi_2SiCl_2$, $CH_2=C(CH_3)CH_2SiCl_3$ and $(CH_2=C(CH_3)CH_2)_2SiCl_2$ in the molar proportions 2/5/5, respectively, was diluted with approximately twice its volume of dioxane and then hydrolyzed and inter-condensed by the slow addition of a 1:3 solution of water in dioxane. After removing the solvent and after heating for one hour at 190° C., the product set to a hard crumbly resin. (Methallyl radicles are lost; incorporation of more diphenyl compound would give a tougher resin.)

Composition: 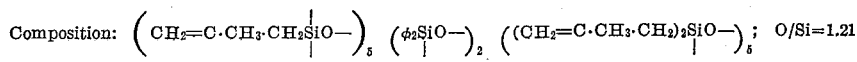

Example 67

To a mixture of $(\phi CH_2)_2Si(OH)_2$, $$CH_2=CHCH_2SiCl_3 \text{ and } (CH_2=CHCH_2)_2SiCl_2$$

in the molar proportions 2/5/5, respectively, was added slowly 95% ethyl alcohol to effect hydrolysis and inter-condensation. Water was then added in slight excess to complete the reaction. After boiling off the solvents a liquid remained which appeared to lose radicles and a hard crumbly thermosetting resin was obtained on heating at 190° C.

Composition: 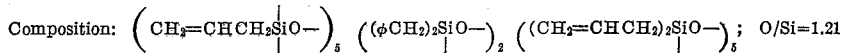

Example 68

To a solution of $\phi MeSi(OEt)_2$ and $C_{12}H_{25}SiCl_3$ in the molar proportions 1/2 was added slowly 95% ethyl alcohol to effect hydrolysis and inter-condensation. Water was then added in slight excess to complete the reaction. After boiling off the solvents and heating for three hours at 190° C., a somewhat hard thermosetting resinous film was obtained.

Composition: 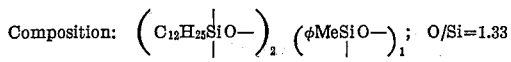

Example 69

To a solution of $\phi CH_2(Me)Si(OEt)_2$, $$\phi MeSi(OEt)_2 \text{ and } MeSi(OEt)_3$$

in the molar proportions 1/1/3 respectively 95% ethyl alcohol containing a few drops of concentrated hydrochloric acid was added slowly with warming to effect hydrolysis and co-polymerization. Water was then added in excess to carry the reaction to completion. After evaporating the solvents and heating for twenty-four hours at 190° C., a hard and tough thermosetting resin was obtained.

Composition:
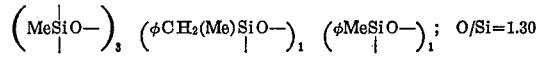

Example 70

To a solution of $\phi CH_2(Me)Si(OEt)_2$, $$Me_2Si(OEt)_2 \text{ and } MeSi(OEt)_3$$

in the molar proportions 1/1/3 respectively 95% ethyl alcohol containing a few drops of concentrated hydrochloric acid was added slowly with warming to effect hydrolysis and co-polymerization. Water was then added in excess. After evaporating the solvents, a thermoplastic resin was obtained in three hours by heating the copolymer at 190° C., which hardened somewhat with further heating.

Composition:
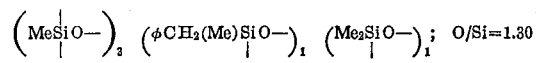

Example 71

To a solution of $\phi MeSi(OEt)_2$, $Me_2Si(OEt)_2$ and $\phi SiCl_3$ in the molar proportions 1/1/3 respectively was added slowly 95% ethyl alcohol to effect hydrolysis and inter-condensation. Water was then added in slight excess. After boiling off the solvents and heating at 190° C. the viscous oil gave a thermoplastic resin which gradually set. Although somewhat tacky in twenty-four hours, a hard and tough film was obtained by heating forty-eight hours at 190° C.

Composition: 

Example 72

To a solution of $\phi CH_2CH_2(Me)Si(OEt)_2$, $\phi_2SiCl_2$ and $MeSi(OEt)_3$ in the molar proportions 1/1/3 respectively, 95% ethyl alcohol containing a few drops of concentrated hydrochloric acid was added slowly with warming to effect hydrolysis and co-polymerization. Water was then added in excess. After evaporating the solvents, the concentrated oil gives an excellent clear hard tough thermoplastic resin upon heating four hours at 190° C. In less than twenty hours at this temperature the resin set, retaining its excellent qualities.

Composition:

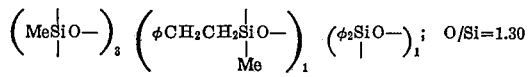

CLASS 5

Example 73

A small sample of liquid phenylsilicic acid, $\phi SiOOH$, in benzene solution was boiled down to remove water. Benzene was again added. A volume of φMe₂SiCl, equal to the phenyl silicic acid was then added. After evolution of HCl had ceased the solution was evaporated on the hot plate. A rather hard brittle resin remained after continuing the heating for a short time.

Example 74

A mixture of equi-molecular parts of φSiCl₃ and φMe₂SiCl was treated dropwise with water dissolved in dioxane. Addition was stopped when a turbidity developed which did not disappear with vigorous shaking. The resultant mixture was poured into water and the immiscible product was separated, washed and dried. It was a viscous oil which remained liquid after twenty hours of heating at 180°–190° C. where it was amply exposed to air in a thin film. It was still essentially unchanged with no indication of evaporation after fifty hours at the same temperature.

Composition: 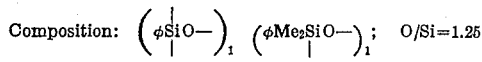

Example 75

When MeSi(OEt)₃ and φMe₂SiCl in the molar ratio 3/1 were hydrolyzed and inter-condensed by dropwise addition of water, followed by evaporation of excess water and alcohol a thick oil remained, which was essentially unchanged after ninety-six hours at 180°–190° C.

Composition: 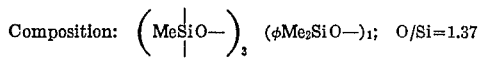

Example 76

0.3 part by weight of φ₃SiCl and 11.6 parts by weight of MeSi(OEt)₃ were refluxed for a half hour with 5.2 parts by weight of anhydrous alcohol. The amount of water required for complete hydrolysis was added dropwise to the mixture. Films of this material set to an infusible state within thirty minutes at 180° C.; they are more flexible than films of monomethyl silicon oxide alone.

Composition: 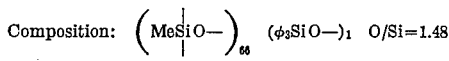

Example 77

0.3 part by weight of φ₃SiCl and 7.3 parts by weight of φSiCl₃ were dissolved in approximately two volumes of dioxane. An excess of distilled water was added dropwise at room temperature. The material was initially thermoplastic but set to an infusible resin on heating 3 to 25 hours at 180° C. It forms a good high temperature paint on admixture with appropriate pigments such as ochre, ultramarine, etc.

Composition: 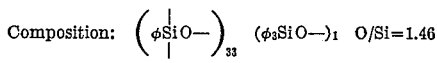

Example 78

0.25 part by weight of φ₃SiCl and 2.21 parts by weight of φSiCl₃ were dissolved in 2.4 parts by weight of dioxane. The theoretical amount of water was added. Some material precipitated out which was redissolved by adding more dioxane. The product, after evaporating the solvents, was a tacky thermoplastic resin. Gradual thermosetting occurred on heating at 150° C., and after 12 to 18 hours heating it had set to a hard infusible coating.

Composition: 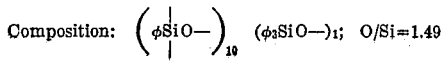

Example 79

0.60 gram of MeSi(OEt)₃ and 0.33 gm. of φ₃SiCl were dissolved in 2.04 gms. of anhydrous ethyl alcohol. Twice the theoretical amount of water for complete hydrolysis, 0.20 gm., was added. The product was a soft resin which showed signs of hardening after five to six hours at 180° C. This material as films on glass plates will withstand much longer periods of heating at 180°–250° C. without crazing than will methyl silicic acid under similar conditions.

Composition: 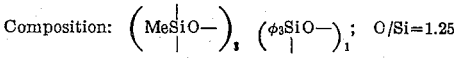

Example 80

0.13 gram of φ₃SiCl and 0.78 gm. of MeSi(OEt)₃ were dissolved in 2.4 gms. of anhydrous ethyl alcohol. Twice the theoretical weight of water required for complete hydrolysis was added dropwise. The viscous soft resin obtained on evaporating alcohol and water was found to set rapidly on heating.

Composition: 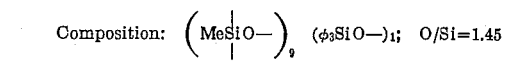

Example 81

To a solution of Me₃SiOEt and φSiCl₃ in the molar proportions 1/4 was added slowly 95% ethyl alcohol to effect hydrolysis and inter-condensation. Water was then added in slight excess. After boiling off the solvents, the viscous oil was slowly converted at 190° C. into a slightly tacky thermoplastic resin.

Composition: 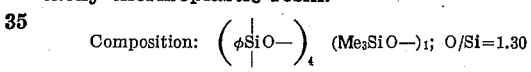

Example 82

To a solution of (φCH₂)₃SiCl and MeSi(OEt)₃ in the molar proportions 1/5, 95% ethyl alcohol containing a few drops of concentrated hydrochloric acid was added slowly with warming to effect hydrolysis and inter-condensation. Water was then added in excess. After evaporating the solvents, a hard but tough, non-brittle thermosetting resin was obtained in three hours at 190° C., which remained unaltered after an additional twenty-four hours at this temperature.

Composition: 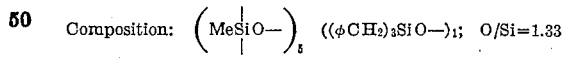

Example 83

To a solution of Me₃SiOEt and φCH₂SiCl₃ in the molar proportions 1/4 was added slowly 95% ethyl alcohol to effect hydrolysis and inter-condensation. Water was then added in slight excess. After boiling off the solvents, the very viscous liquid gave a good thermoplastic resin when heated at 190° C. for 48 hours. After this time it gradually set, although it was still slightly tacky at elevated temperatures.

Composition: 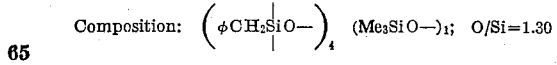

Example 84

To a solution of φ₂MeSiOEt and MeSi(OEt)₃ in the molar proportions 1/3, 95% ethyl alcohol containing a few drops of concentrated hydrochloric acid was added slowly with warming to effect hydrolysis and inter-condensation. Water was then added in excess. After evaporating the solvents, a soft thermoplastic resin was obtained by six hours heating at 190° C. The resin had nearly set in 24 hours, and was quite tough though still somewhat soft and flexible after 48 hours at 190° C.

Composition: 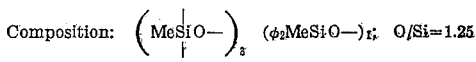 O/Si=1.25

CLASS 6

Example 85

Equi-molecular parts of φMe₂SiCl and

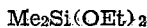

were mixed, and treated dropwise with the calculated amount of water for complete hydrolysis diluted with four volumes of alcohol. On evaporation of solvent a mobile liquid remained, which was unchanged by heating and should be satisfactory as a transformer oil.

Composition: 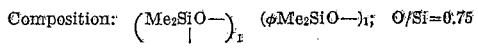 O/Si=0.75

Example 86

Two equivalents of φMeSiCl₂ and one of

were mixed and diluted with dioxane. An amount of water slightly in excess of the calculated quantity was slowly added. On dilution with water after completion of the inter-condensation the product was precipitated as an oil.

Composition: 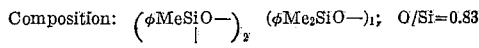 O/Si=0.83

Example 87

2 cc. of anhydrous ethyl alcohol were added to 1 gram of tribenzyl silicon chloride and 8.7 grams of Me₂Si(OEt)₂. The mixture was allowed to stand for one hour and then an equal volume of a 1 to 1 mixture of concentrated aqueous HCl and 95% ethyl alcohol was added. The mixture was heated and then diluted with water. The product was a homogeneous oil which was comparable to dimethyl silicone in its lubricating properties.

Composition: (Me₂SiO—)₁₉ ((φCH₂)₃SiO—)₁; O/Si=.975

Example 88

To a solution of Me₃SiOEt and (CH₂=C(CH₃)CH₂)₂SiCl₂ in the molar proportions 1/2 was added slowly 95% ethyl alcohol to effect hydrolysis and inter-condensation. Water was then added in slight excess. After boiling off the solvents, an oily liquid remained, which appeared to lose methallyl radicles since after heating two hours at 190° C., a hard brittle thermosetting resin was obtained (although not as brittle as from the methallyl compound alone).

Composition: 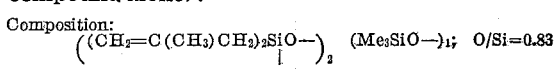

Example 89

To a solution of φCH₂(φ)SiCl₂ and Me₃SiOEt in the molar proportions 1/2 was added slowly 95% ethyl alcohol to effect hydrolysis and inter-condensation. Water was then added in slight excess. After boiling off the solvents, the concentrated product was a slightly viscous liquid.

Composition: 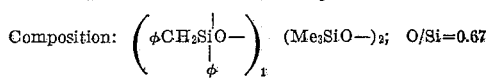

Example 90

To a solution of Me₂Si(OEt)₂ and Me₃SiOEt in equimolar proportions 95% ethyl alcohol containing a few drops of concentrated hydrochloric acid was added slowly with warming to effect hydrolysis and inter-condensation. Water was then added in excess. After evaporating the solvents, a low viscosity liquid product of wide boiling range was obtained.

Composition: 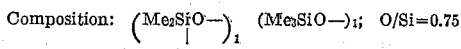 O/Si=0.75

Example 91

As in the previous example Me₂Si(OEt)₂ and Me₃SiOEt were co-hydrolyzed and inter-condensed, except that the molecular proportions were 10:1 respectively. A liquid product of somewhat higher viscosity and boiling range than that in the previous example was obtained.

Composition: 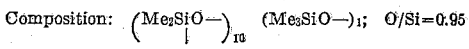 O/Si=0.95

Example 92

To a solution of (φCH₂)₃SiCl and Me₂Si(OEt)₂ in the molar proportions 1/5 was added slowly 95% ethyl alcohol to effect hydrolysis and inter-condensation. Water was then added in slight excess. After boiling off the solvents, the concentrated product was a rather viscous liquid.

Composition: 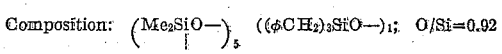 O/Si=0.92

CLASS 7

Example 93

0.01 mol of Si(OEt)₄, 0.01 mol of MeSi(OEt)₃ and 0.01 mol of Me₂Si(OEt)₂ were mixed. 1.6 grams of 0.5% HCl were mixed with 2 cc. of ethyl alcohol and then were added dropwise to the mixed esters. Evaporation of solvent in vacuo gave a viscous mass. A film of this material on a glass plate was water-clear and crazed on drying out at room temperature.

Composition:

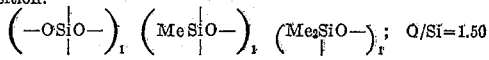 O/Si=1.50

Example 94

Equimolecular parts of ethyl orthosilicate and p-tolyltriethoxysilicane and benzylmethyldiethoxy silicane were mixed and diluted threefold with dry dioxane. An excess or water slightly acidified with HCl and diluted with an equal volume of dioxane was added dropwise. Solvents were removed under reduced pressure. The material was a thermoplastic resin which was somewhat soft at room temperature. Thermosetting occurred within 18 hours at 180° C.

Composition:

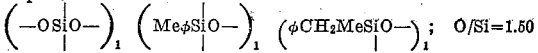 O/Si=1.50

Example 95

Equal molar proportions of Si(OEt)₄, φSiCl₃ and φMeSiCl₂ were mixed and dissolved in an equal volume of dioxane. The compounds were hydrolyzed by dropwise addition of a solution of water and dioxane in the volumetric proportions of 1/2. The solvent and excess water were subsequently removed by evaporation at room temperature under reduced pressure. The resulting copolymer was a solid thermoplastic resin. When heated on a glass plate for 1½ hours at 190° C. thermosetting occurred to give a hard film.

Composition:

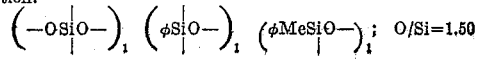 O/Si=1.50

CLASS 8

Example 96

One molecular part of tribenzyl silicol was added to a mixture of one molecular part of silicon tetrachloride and one molecular part of benzyl silicon trichloride. On warming gently so that the more volatile components of the mixture were retained by reflux the crystals of tribenzyl silicol were dissolved. The solution was then diluted with an equal volume of dioxane. A mixture of water and dioxane, one to one by volume, was added dropwise until a slight turbidity was evident. The solution was freed of volatile materials under reduced pressure. The material was a viscous oil which was still liquid after heating 18 hours at 180° C. but which set to a relatively soft resin on cooling after such heating.

Composition:

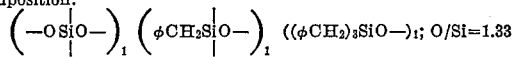

CLASS 9

Example 97

Si(OEt)$_4$, Me$_2$Si(OEt)$_2$ and ($\phi$CH$_2$)$_3$SiCl were mixed in the mol ratio 3/3/1 and three volumes of dioxane were added. Solution was complete when the mixture was warmed. 0.5% HCl diluted with dioxane was added dropwise. The solution was concentrated to leave a tacky solid, which was thermoplastic, but which thermosets in 1 hour at 180° C.

Composition:

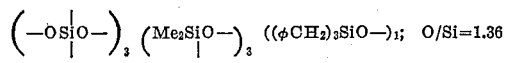

CLASS 10

Example 98

Me$_2\phi$Si(OEt)$_3$, Me$_2$Si(OEt)$_2$, and $\phi$Me$_2$SiOEt were mixed in equimolecular proportions and diluted with dioxane. 4% aqueous HCl mixed with dioxane was added dropwise. The solution was concentrated under reduced pressure leaving a viscous oil.

Composition:

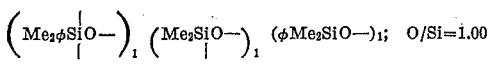

Example 99

Equimolecular proportions of $\phi$MgCl, EtMgCl and SiCl$_4$ in ether solution were slowly mixed and maintained at 20°–30° C. until the reaction was completed. The ether was then distilled off leaving a mixture of mono-, di- and tri-substituted silicon chlorides. This was diluted with 2 volumes of dioxane and treated with moist air. Evaporation on the hot plate gave a viscous liquid which gelled quite rapidly to a rubbery mass, which was quite tough and hard after three hours.

Example 100

Equal molar proportions of MeSi(OEt)$_3$, $\phi$EtSiCl$_2$ and $\phi$Me$_2$SiOEt were mixed and dissolved in an equal volume of dioxane. The compounds were hydrolyzed by dropwise addition of a solution of water and dioxane in the volumetric proportions of 1/2. The solvent and excess water were subsequently removed by evaporation at room temperature under reduced pressure. The resulting product was a liquid of low viscosity. It did not solidify when heated on a glass plate for 1½ hours at 190° C.

Composition:

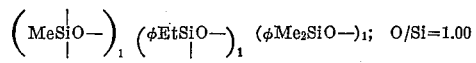

CLASS 11

Example 101

Si(OEt)$_4$, MeSi(OEt)$_3$, Me$_2$Si(OEt)$_2$, and ($\phi$CH$_2$)$_3$SiCl were mixed in the mol ratio of 1/1/1/3. The chloride was only partially soluble in the mixed esters. The addition of a small amount of benzene brought complete solution. Dilute aqueous HCl was further diluted with two volumes of ethyl alcohol and added dropwise to the above mixture with warming. After evaporation a tacky resin remained. Thermosetting occurred during six hours of heating at 180° C.

Composition:

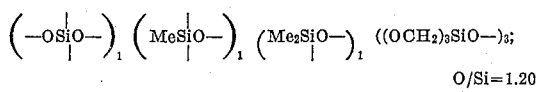

Example 102

Equi-molecular parts of Si(OEt)$_4$,

MeφSi(OEt)$_3$ $\phi$CH$_2$(Me)Si(OEt)$_2$, and Me$_3$SiOEt were mixed and diluted with two volumes of dioxane. Hydrolysis and inter-condensation were brought about by the addition of aqueous dioxane with a trace of HCl. On removal of solvent a resin remained which was very soft at room temperature and fluid at 180° C.

Composition:

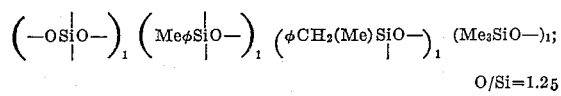

Example 103

Equal molar proportions of Si(OEt)$_4$, $\phi$SiCl$_3$, ($\phi$CH$_2$)$_2$SiCl$_2$ and Me$_3$SiOEt were mixed and dissolved in an equal volume of dioxane. The compounds were hydrolyzed by dropwise addition of a solution of water and dioxane in the volumetric proportions of 1:2. The solvent and excess water were subsequently removed by evaporation at room temperature under reduced pressure. The resulting product was a viscous liquid and when heated on a glass plate for one and a half hours at 190° C. it became a tough thermoplastic film.

Composition:

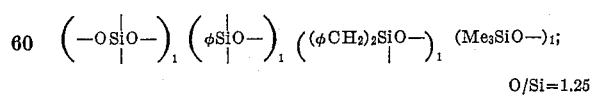

CLASS 12

Example 104

One gram of dodecyl silicon trichloride and 6.3 grams of phenyl silicon trichloride were added to 10 grams of anhydrous ethyl alcohol. Homogeneity resulted after the addition of 5 grams of Cellosolve. An excess of water was added dropwise. A soft tacky resin remained after solvent removal. On heating for a short time at 265° C., films on glass and metal were still somewhat soft. Further heating caused the films to become very hard. Tests with pigments in- Composition: 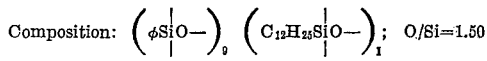 O/Si=1.50

Example 105

Eleven grams of anhydrous ethyl alcohol were added to a mixture of one gram dodecyl silicon trichloride and 2.09 grams of phenyl silicon trichloride. After the evolution of HCl had largely stopped 0.36 gram of water (1½ mols per mol of mixed chlorides) were added dropwise with shaking. The resin is liquid while hot after one hour heating at 175° C. On heating for 16 hours at 265° C., the sample had set. This co-polymer with pigments gave good high-temperature paints.

Composition: 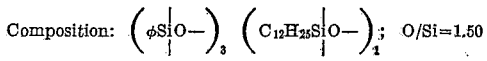 O/Si=1.50

Example 106

One gram of dodecyl silicon trichloride and 5.3 grams of MeSi(OEt)₃ were dissolved in 10 grams of Cellosolve. 0.15 to 0.20 gram of ethyl alcohol were added dropwise. The solution was heated and 0.9 gram of water was added. After freeing from solvents the resinous product was homogeneous. This indicates that the product is a co-polymer because mixtures of the individual resins per se are not homogeneous. Setting occurred within an hour at 175° C., yielding a very brittle resin.

Composition: 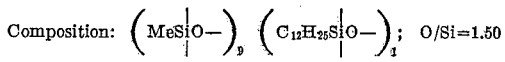 O/Si=1.50

Example 107

0.2 mol of MeSi(OEt)₃ and 0.02 mol of φSiCl₃ were mixed. About 5 cc. of anhydrous ethyl alcohol were added and the mixture was heated on the hot plate till the evolution of HCl became inappreciable. 0.06 mol of water was added dropwise. Cellosolve was then added and the mixture was heated to boiling for fifteen minutes. A soft resin was obtained on driving off the solvents. After one hour heating at 180° C., a stable hard film remained.

Composition: 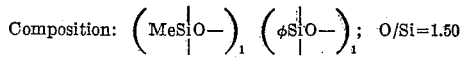 O/Si=1.50

Example 108

MeSi(OEt)₃ and φSiCl₃ were mixed in the molar ratio of 1/3. Five grams of anhydrous ethyl alcohol were added and the mixture heated until the evolution of HCl had become inappreciable. Twice the calculated amount of water was added dropwise, Cellosolve was then added; the mixture was heated to boiling for fifteen minutes. The co-polymer was a somewhat soft resin; it became very brittle on heating one hour at 180° C.

Composition: 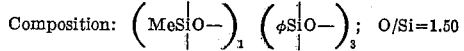 O/Si=1.50

Example 109

φSiCl₃ and MeSi(OEt)₃ were mixed in the molar ratio of 3/1. Five grams of ethyl alcohol were added and the mixture was heated till the evolution of HCl became inappreciable. 0.03 mol of water were added dropwise and the mixture was heated to boiling for 15 minutes. The co-polymer was a soft resin. On heating a film of this material one hour at 180° C. on a glass plate, a hard water-clear resin was obtained. This material should be of value as a baking varnish.

Composition: 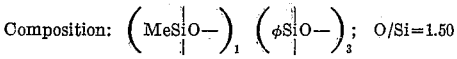 O/Si=1.50

Example 110

To a solution of φCH₂CH₂SiCl₃ and MeSi(OEt)₃ in equimolecular proportions was added slowly 95% ethyl alcohol to effect hydrolysis and inter-condensation. Water was then added in slight excess. After boiling off the solvents, the concentrated viscous oil was applied to a glass plate and heated over a hot plate at 190° C. In two hours the product had set to a hard and slightly brittle film. The brittleness increased somewhat upon heating an additional twenty hours.

Composition: 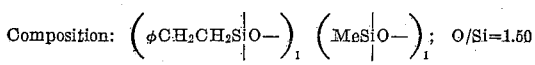 O/Si=1.50

Example 111

A solution of φCH₂SiCl₃ and C₁₂H₂₅SiCl₃, in the molar proportions 2/1 was diluted with approximately twice its volume of dioxane and then hydrolyzed and into-condensed by the slow additions of a 1:3 solution of water in dioxane. After removing the solvent, the concentrated liquid was applied to a glass plate. Upon heating at 190° C. for two hours, a hard and somewhat brittle thermosetting resinous film was obtained.

Composition: 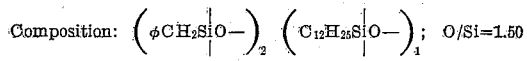 O/Si=1.50

Example 112

A solution of φSiCl₃ and C₁₂H₂₅SiCl₃ in the molar proportions of 2/1 was diluted with approximately twice its volume of dioxane and then hydrolyzed and inter-condensed by the slow additions of a 1:3 solution of water in dioxane. After removing the solvent, a hard brittle thermosetting resinous film was obtained after one hour at 190° C.

Composition: 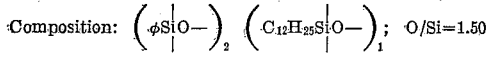 O/Si=1.50

Example 113

A solution of φCH₂SiCl₃ and

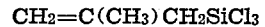

in equi-molar proportions was diluted with approximately twice its volume of dioxane and then hydrolyzed and inter-condensed by the slow addition of a 1:3 solution of water in dioxane. After removing the solvent, the product set to a tough hard resin at 190° C. in two hours but became brittle in twenty additional hours.

Composition:
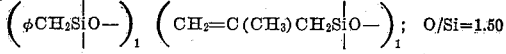 O/Si=1.50

Example 114

To a solution of MeSi(OEt)₃ and C₁₂H₂₅SiCl₃ in the molar proportion 3/1 was added slowly 95% ethyl alcohol to effect hydrolysis and inter-condensation. Water was then added in slight excess. After boiling off the solvents, the concentrated product set in less than one-half hour at 190° C. to a rubbery but crumbly resinous solid.

Composition: 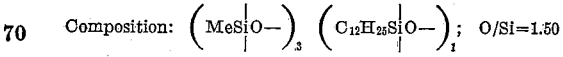 O/Si=1.50

Example 115

A solution of φCH₂SiCl₃ and φCH₂CH₂SiCl₃ in equimolar proportions was diluted with approximately twice its volume of dioxane and then hydrolyzed and inter-condensed by the slow addition of a 1:3 solution of water in dioxane. After removing the solvent, the product yielded a hard thermoplastic resinous film in three hours at 190° C. which became a hard and brittle thermosetting resin in twenty hours.

Composition: $(\phi CH_2 \underset{|}{Si} O-)_1 (\phi CH_2CH_2 \underset{|}{Si} O-)_1$; O/Si=1.50

CLASS 13

Example 116

A mixture of one volume of $\phi_2 SiCl_2$ and 4 volumes of $\phi EtSiCl_2$ after diluting with an equal volume of dioxane was hydrolyzed by dropwise addition of aqueous dioxane. A viscous liquid resulted, which increased somewhat in viscosity with six or eight hours of heating at 200° C. Extended heating finally caused hardening.

Composition: $(\phi_2 \underset{|}{Si} O-)_1 (\phi Et \underset{|}{Si} O-)_5$; O/Si=1.00

Example 117

Equimolecular proportions of $\phi EtSiCl_2$ and $Me_2Si(OEt)_2$ were mixed, diluted with dioxane and treated dropwise with aqueous dioxane with warming and stirring. After evaporation of solvent and any excess water a clear homogeneous oil of medium viscosity remained which was unchanged by further heating. For comparison, samples of the corresponding silicones were mixed. They formed two immiscible layers which became miscible on heating but separated again on cooling.

Composition: $(\phi Et \underset{|}{Si} O-)_1 (Me_2 \underset{|}{Si} O-)_1$; O/Si=1.00

Example 118

The co-polymerization of $Me_2Si(OEt)_2$ and $\phi_2 SiCl_2$ was carried out in dioxane with equimolecular proportions. The result was a clear homogeneous liquid of medium viscosity, unchanged by further heating.

Composition: $(Me_2 \underset{|}{Si} O-)_1 (\phi_2 \underset{|}{Si} O-)_1$; O/Si=1.00

Example 119

To a solution of $(\phi CH_2)_2 SiCl_2$ and $Me_2Si(OEt)_2$ in the molar proportions 1/2 was added slowly 95% ethyl alcohol to effect hydrolysis and inter-condensation. Water was then added in slight excess. After boiling off the solvents, and upon heating at 190° C. the very viscous oil became a thermoplastic resin in 5 hours.

Composition: $((\phi CH_2)_2 \underset{|}{Si} O-)_1 (Me_2 \underset{|}{Si} O-)_2$; O/Si=1.00

Example 120

To a solution of $\phi CH_2(Me)Si(OEt)_2$ and $Me_2Si(OEt)$ in the molar proportions 1/2, 95% ethyl alcohol containing a few drops of concentrated hydrochloric acid was added slowly with warming to effect hydrolysis and co-polymerization. Water was then added in excess. After evaporating the solvent, a very viscous oily product remained which formed at 190° C. in forty-eight hours a soft waxy resin.

Composition: $(Me_2 \underset{|}{Si} O-)_2 (\phi CH_2 \underset{\underset{Me}{|}}{\overset{|}{Si}} O-)_1$; O/Si=1.00

Example 121

To a solution of $\phi MeSi(OEt)_2$ and $Me_2Si(OEt)_2$ in equimolar proportions 95% ethyl alcohol containing a few drops of concentrated hydrochloric acid was added slowly with warming to effect hydrolysis and co-polymerization. Water was then added in excess. After evaporating the solvents, a rather viscous liquid is obtained. When a small sample of this was applied to a glass plate for seventy-two hours at 190° C., it remained tacky.

Composition: $(\phi MeSi O-)_1 (Me_2Si O-)_1$; O/Si=1.00

CLASS 14

Example 122

To a solution of $\phi_2 MeSiOEt$ and $\phi Me_2SiOEt$ in equimolar proportions 95% ethyl alcohol containing a few drops of concentrated hydrochloric acid was added slowly with warming to effect hydrolysis and inter-condensation. Water was then added in excess. After evaporating the solvents, the fluid product appeared to have a viscosity and boiling range intermediate between that of bis-phenyldimethylsilicyl oxide and bis-diphenylmethylsilicyl oxide.

Composition: $\phi_2 MeSi-O-Si\phi Me_2$; O/Si=0.50

Example 123

$(\phi CH_2)_3 SiCl$ was dissolved in 3 molar excess of $(Me)_3 SiOEt$ to insure the maximum yield of mixed oxide. To this solution was added slowly 95% ethyl alcohol to effect hydrolysis and inter-condensation. Water was then added in slight excess. After boiling off the solvent and excess trimethyl compound (as the volatile oxide, $Me_3Si-O-SiMe_3$, B. P. 98° C.), a slightly viscous liquid product was obtained which is the mixed oxide. (The oxide from the tribenzyl compound alone is solid, that from the trimethyl compound is very fluid.)

Composition: $Me_3Si-O-Si(\phi CH_2)_3$; O/Si=0.50

Example 124

As in the preceding example $\phi_3 SiOH$ and $Me_3 SiOEt$ were co-hydrolyzed and inter-condensed. As in the preceding example, a liquid of intermediate viscosity was obtained as the product.

Composition: $\phi_3 Si-O-SiMe_3$; O/Si=0.50

As has been pointed out it is possible to predict the general properties of the inter-condensates on the basis of the oxygen/silicon ratio and the secondary effect of the size of the organic radicles. However, in all organo-silicon compounds the thermal stability of the carbon-silicon linkage varies with the kind of radicle. It is necessary to take this into account when considering uses for organo-siloxanes. In general there is a decrease in thermal stability with increase in size of aliphatic radicles. This is clearly shown by comparison of the thermal behavior of organo-siloxanes containing methyl radicles with those containing dodecyl radicles, as for instance Example 109 and Example 112. The compositions containing allyl, methallyl, benzyl and β-phenylethyl radicles are relatively less stable than compositions containing such radicles as phenyl, methyl, ethyl, etc. Therefore certain temperature limitations are encountered in their uses.

It will be seen that the inter-condensates produced by my method are not mixtures of individual polymers but are new compounds differing therefrom in homogeneity of structure and properties as shown in Examples 25, 32, 33, 106, 117 and 123. It will further be seen that the new polymers may contain various different radicles attached to the same silicon atom and the individual silicon atoms may differ in the number and kind of radicles attached thereto in which respect the new polymers differ from previous organo-silicon polymers where each silicon atom was attached to the same kind of radicles. Such differences result in new compounds which embody various improvements over previous polymers with respect to temperature coefficient of change of viscosity, thermal resistivity, chemical stability, electrical properties, etc.

The organo-siloxanes produced by my method may be adapted to various uses and for any specific use the physical properties and characteristics of the product can be controlled by the proper selection of the initial starting materials so as to obtain the desired oxygen to silicon ratio and a suitable variety of radicles attached to the silicon atom. Products which remain liquid with little or no tendency for further polymerization even at elevated temperatures include products having an oxygen to silicon ratio between 0.5 and 1.0 and particularly those containing lower alkyl radicles. Such products have good electrical properties whereby they may be used as the liquid filling medium for transformers, circuit breakers, submarine cables, condensers, etc. In general these products have an unusually low coefficient of change of viscosity with temperature and may find use in hydraulic pressure systems which are subjected to wide changes of temperatures or as lubricants for systems of moving parts operating under subnormal or abnormal temperatures.

More viscous liquid products such as those wherein the oxygen to silicon ratio lies in the neighborhood of 1.0 or more may also be used for lubricants and are particularly useful as damping media in delicate instruments and the like.

Thermoplastic and thermosetting products having an oxygen-silicon ratio usually greater than 1.0 are useful as molding compounds, film forming coatings, varnishes, impregnating agents for electrical insulation and the like. They may be applied as solutions of the incompletely condensed organo-siloxanes and after evaporation of the solvent can be further polymerized in situ. The more brittle products should be useful embedding media for condenser plates as well as molding compounds. Such products usually have an oxygen-silicon ratio of 1.5 or greater and may be thermoset in situ by heat.

What I claim is:

A copolymeric organo siloxane consisting of hydrocarbon-substituted silicon units which correspond to the formulae $(C_6H_5)Si\equiv$ and $(CH_3)_2Si=$ respectively, the free valences of which are interconnected by oxygen atoms of siloxane linkages, said oxygen atoms satisfying the remaining valences of said silicon atoms in said units, and the atomic ratio of oxygen to silicon in said siloxane being 1.3 to 1.

JAMES FRANKLIN HYDE.

REFERENCES CITED

The following references are of record in the file of this patent:

UNITED STATES PATENTS

| Number | Name | Date |
|---|---|---|
| 2,258,218 | Rochow | Oct. 7, 1941 |
| 2,258,220 | Rochow | Oct. 7, 1941 |
| 2,258,222 | Rochow | Oct. 7, 1941 |
| 2,371,050 | Hyde | Mar. 6, 1945 |
| 2,386,466 | Hyde | Oct. 9, 1945 |
| 2,442,212 | Rochow | May 25, 1948 |

OTHER REFERENCES

Ellis: The Chemistry of Synthetic Resin, 1935, vol. I, pages 42 and 43.

Kipping: Tr. J. Chem. Soc. (London), vol. 101, 1912, pp. 2109–2112.

Dilthey: Berichte Deut. Chem. Gesel, vol. 37, 1904, pp. 1139 to 1142.

Kipping: Tr. J. Chem. Soc. (London), vol. 101, 1912, pp. 2108, 2113 and 2114.

Meads: Tr. J. Chem. Soc. (London), vol. 105, 1914, pp. 679 and 680.

Robison et al.: Journ. Chem. Soc. (London), vol. 101, 1912, pages 2156–2166.

Meads et al.: Journ. Chem. Soc. (London), vol. 107, 1915, pages 459–469.

Koton: J. Applied Chem., U. S. S. R., vol. 12, pages 1435 to 1439 (1939).

Chemical Abstracts, pages 6242 to 6243 (1940).

Beilstein: Handbuch der Organ. Chemie, vol. XVI, pages 905 and 910, 1933.

Certificate of Correction

Patent No. 2,486,162                                October 25, 1949

JAMES FRANKLIN HYDE

It is hereby certified that errors appear in the printed specification of the above numbered patent requiring correction as follows:

Column 5, line 28, for that portion of the formula reading "($R_2Si-$)" read ($R_2Si-$); column 7, line 33, for "2.99" read *1.99*; column 13, line 52, after the word "clear" insert *tough*; column 21, line 75, for "1.49" read *1.40*; column 27, line 39, for "0.2 mol" read *.02 mol*;

and that the said Letters Patent should be read with these corrections therein that the same may conform to the record of the case in the Patent Office.

Signed and sealed this 28th day of February, A. D. 1950.

[SEAL]

THOMAS F. MURPHY,
                                                          *Assistant Commissioner of Patents.*